US010783583B1

(12) United States Patent
Gunn, Jr. et al.

(10) Patent No.: US 10,783,583 B1
(45) Date of Patent: Sep. 22, 2020

(54) MONITORED ALERTS

(71) Applicant: Wells Fargo Bank, N.A., San Francisco, CA (US)

(72) Inventors: Duke Lee Gunn, Jr., Saint Louis, MO (US); Daniel Gracey, Lake Saint Louis, MO (US); Jefferson Crew, Plano, TX (US); Lisa Rome, Ballwin, MO (US); Paresh Mutha, Waxhaw, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 932 days.

(21) Appl. No.: 15/146,406

(22) Filed: May 4, 2016

(51) Int. Cl.
*G06Q 40/00* (2012.01)
*G06Q 40/06* (2012.01)
*G08B 21/18* (2006.01)

(52) U.S. Cl.
CPC ........... *G06Q 40/06* (2013.01); *G08B 21/182* (2013.01)

(58) Field of Classification Search
CPC .................................................... G06Q 40/06
USPC ........................................................ 705/36 R
See application file for complete search history.

(56) References Cited

U.S. PATENT DOCUMENTS

| 6,021,397 | A | 2/2000 | Jones et al. |
| 7,469,226 | B2 | 12/2008 | Escher |
| 7,970,934 | B1 | 6/2011 | Patel |
| 8,429,051 | B1 | 4/2013 | Samson |
| 8,570,326 | B2 | 10/2013 | Gorev |
| 9,330,174 | B1 * | 5/2016 | Zhang ..................... G06F 16/95 |
| 2002/0004774 | A1 | 1/2002 | Defarlo |
| 2002/0035533 | A1 | 3/2002 | Mache et al. |
| 2003/0093580 | A1 * | 5/2003 | Thomas ............. H04N 21/4334 719/318 |
| 2003/0115122 | A1 * | 6/2003 | Slater ..................... G06Q 10/10 705/35 |
| 2004/0078464 | A1 | 4/2004 | Rajan et al. |
| 2008/0249952 | A1 | 10/2008 | Benteler |

(Continued)

FOREIGN PATENT DOCUMENTS

| WO | WO-0111529 A1 | 2/2001 |
| WO | WO-2015048181 A1 | 4/2015 |

OTHER PUBLICATIONS

The SIMBA user alert service architecture for dependable alert delivery: Published in: 2001 International Conference on Dependable Systems and Networks (Year: 2001).*

(Continued)

*Primary Examiner* — Bruce I Ebersman
*Assistant Examiner* — John A Anderson
(74) *Attorney, Agent, or Firm* — Schwegman Lundberg & Woessner, P.A.

(57) ABSTRACT

Disclosed in some examples are methods, systems, and machine readable mediums which provide for customized alerts for a user. Alerts may be described by a set of alert parameters. Alert parameters include the type of alerts, the frequency of alerts, and the content of the alerts. While the alert parameters may initially be set based upon the users explicitly entered preferences, the system may monitor one or more indicators to dynamically adjust one or more of the alert parameters. As the indicators allow the automated portfolio management system to respond to the needs of a user, these alerts may increase the personalization of automated portfolio management systems.

12 Claims, 7 Drawing Sheets

(56) References Cited

U.S. PATENT DOCUMENTS

| | | | |
|---|---|---|---|
| 2013/0024364 A1* | 1/2013 | Shrivastava | G06Q 20/38 705/39 |
| 2014/0172668 A1 | 6/2014 | McClintock | |
| 2015/0039531 A1 | 2/2015 | Dayani, Sr. et al. | |
| 2015/0095132 A1 | 4/2015 | Van Heerden et al. | |
| 2015/0142713 A1 | 5/2015 | Gopinathan et al. | |
| 2016/0321935 A1* | 11/2016 | Mohler | G09B 5/08 |
| 2018/0293607 A1* | 10/2018 | Huddleston | G06Q 30/0242 |

OTHER PUBLICATIONS

Matti, Timothy, et al., "Financial fraud detection using social media crowdsourcing", 2014 IEEE 33rd International Performance Computing and Communications Conference, IPCCC 2014, (2014), 2 pgs.

Mehmet, M., et al., "Using dynamic risk estimation & social network analysis to detect money laundering evolution", Technologies for Homeland Security (HST), 2013 IEEE International Conference, (2013), 310-315.

Zhang, Xiaoming, et al., "Event detection and popularity prediction in microblogging", Neurocomputing 149, (2015), 1469-1480.

* cited by examiner

MONITORED ALERTS

TECHNICAL FIELD

Embodiments pertain to electronic delivery of alert data. Some embodiments relate to automatic electronic delivery of alert data.

BACKGROUND

Automated portfolio management systems are computerized systems that provide automated portfolio management services. These services utilize algorithms to trade, adjust, and manage a user's financial portfolio.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
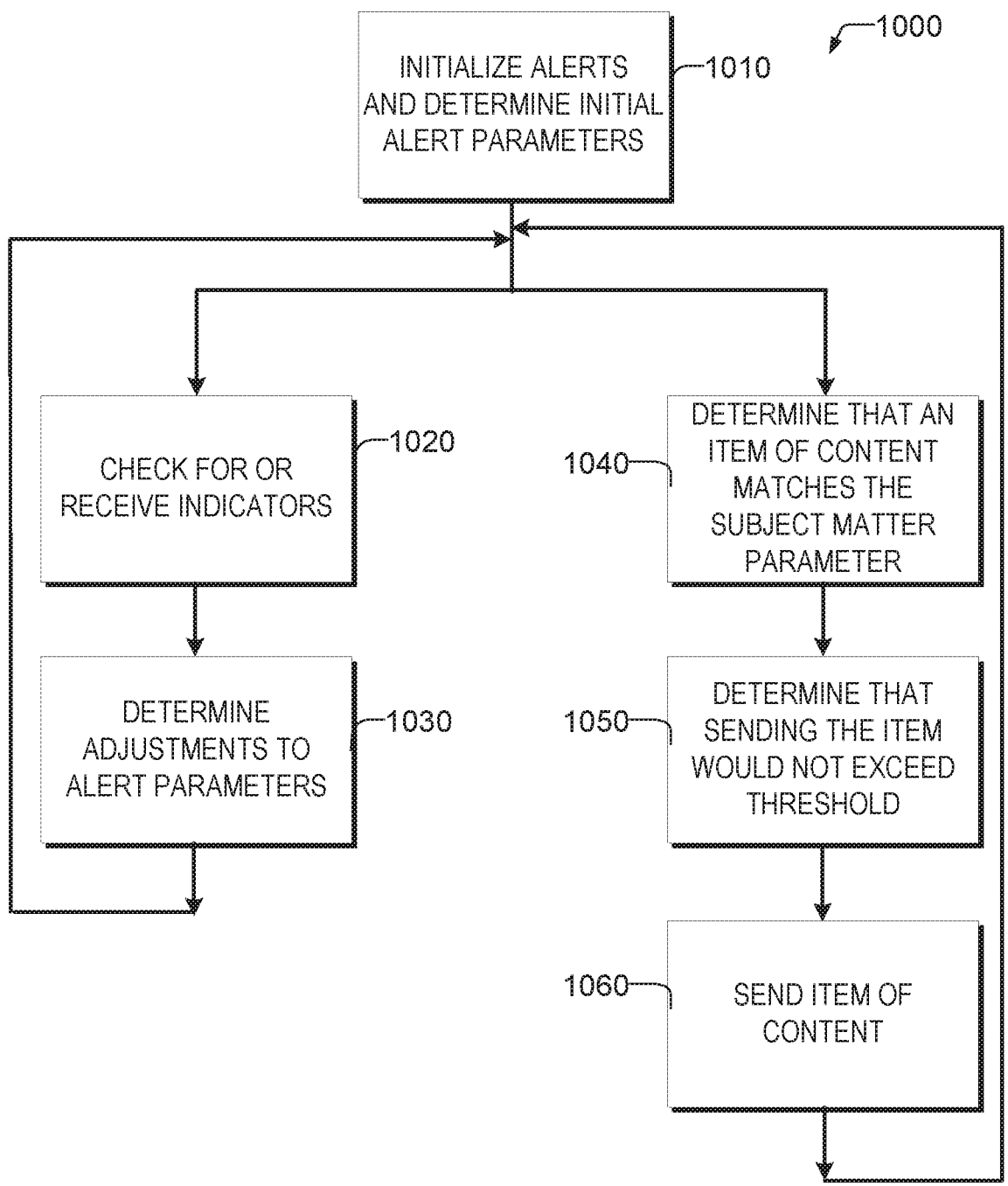
FIG. 1 is a flowchart of an overview method of providing customized alerts according to some examples of the present disclosure.

Automated portfolio management systems currently do not provide the same level of customized service that human financial advisors do. For example, human financial advisors may utilize their knowledge of the sophistication of their client, the client's life events, the client's holdings, and the client's interaction with their holdings to deliver information, news, content, and events that are relevant to their clients. Current automated portfolio management systems do not provide this. As result, users of automated portfolio management systems may feel that they are receiving suboptimal advice and services.

Disclosed in some examples are methods, systems, and machine readable mediums which provide for customized financial information alerts for a user. Financial information alerts (herein "financial alerts." or just "alerts") may be any content relevant to a financial holding or a financial interest of the user. Financial alerts may be described by a set of alert parameters. Alert parameters include the type of alerts, the frequency of alerts, and the content of the alerts. While the alert parameters may initially be set based upon a user's explicitly entered preferences, the system may monitor one or more indicators to dynamically adjust one or more of the alert parameters. As the indicators allow the automated portfolio management system to respond to the needs of a user, these alerts may increase the personalization of automated portfolio management systems.

Indicators may be data or information suggesting a user's preference for one or more particular alert topics, a desired frequency of alerts, and desired type of alerts. Indicators include one or more of: topics indicators, market indicators, life event indicators, sophistication indicators, and the like. Topic indicators indicate interest in a particular financially related topic (e.g., social networking posts about a particular financial topic). Market indicators may be an indicator on the state or movement of one or more financial markets, stocks, bonds, or other financial instruments. Life event indicators may be indications (e.g., online posts, searches, or the like) that the user has experienced a life event. Sophistication indicators provide the system information on the market knowledge and investment experience of the user. Indicators may be determined from one or more of: explicit preferences entered by a user, online content interactions and other online behavior of a user, network-based market price sources, financial news sources, portfolio holdings of the user, and feedback from users in response to alerts sent to the user. Interactions with content may include posting content, liking content, disliking content, sharing content, commenting on the content, or the like. Interactions with content and other online behavior may be determined from online activity of a user, such as from a social networking account, search engine history, email, browser history, Instant Messaging (IM) history, chat history, and the like.

Alert types, alert content, and alert frequency may all be adjusted based upon one or more detected indicators. Alerts may contain any content relevant to the user's financial interests and may comprise market prices, market news, company news, investing advice, financial advice, and the like. Example types of alerts include emails, text messages, mobile application alerts, desktop notifications, voicemails, voice alerts, and the like. Alert frequency may describe how often an alert is sent to a particular user and may be expressed in terms of a number (or limit) of alerts over a predetermined period of time.

The system may dynamically change the topics of the alerts in response to one or more indicators. A user may sign up for the system and enter one or more topics of interest, alert frequency preferences, and alert type preferences. Additionally, the user may allow the system access to their online behavior (such as social networking accounts, search history, and the like). By monitoring a user's online activity, the system may determine that a user is interested in a particular topic that the user did not express interest in when they signed up. For example, a user may express interest in a company, a particular investment topic, market movements, or the like by interacting with content online about a particular topic. In response, the system may discover this and deliver content about the particular topic. As yet another example, the user's online activity indicates that the user has just experienced a life-event, (such as having a baby, getting married, getting divorced, a death in the family, or the like) the system may provide content related to the life event. For example, if the user just had a baby, the system may send content related to an investment plan for saving for college (e.g., a 529 plan). Thus, the system is agile enough to respond to changing interests of the users.

As another example, the system may increase or decrease the frequency with which alerts are sent compared to the frequency that may be specified when the user signs up. For example, the system may determine that the user is not sophisticated and market conditions are changing rapidly. As a result, the system may (temporarily or permanently) increase the frequency of alerts. This allows the system to react dynamically not just with the changing interests and desires of the users, but also with market conditions and based upon the experience level of the user. Thus, the way the system dynamically adjusts may be different depending upon the sophistication of the user. Through the use of one or more indicators, the system may customize the alert parameters to meet an individual's current needs and continue to adapt to their needs over time.

Alert type may also be dynamically adjusted. For example, the system may track interactions with the alerts. Interactions with alerts may include, posting the alert to a social network, liking the alert, disliking the alert, emailing the alert to a friend, commenting on the alert, or the like. Interactions with content may indicate not only interest in the content, but also satisfaction with the alert type. Additionally, the alerts may provide feedback mechanisms that allow them to indicate that they like or dislike an alert topic, an alert frequency, or an alert type. The alert type may be adjusted to send alerts to the user that they like by using one or more of: high interaction rate and positive explicit feedback as indicators of satisfaction with the alert type.

Figure 2:
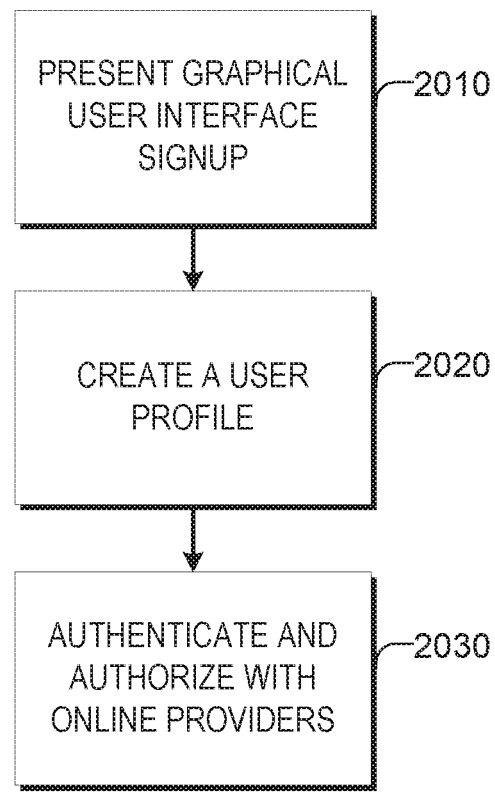
FIG. 2 is a flowchart of a method of a user signing up for the service according to some examples of the present disclosure.

Turning now to FIG. 1, a flowchart of an overview method 1000 of providing customized alerts is shown according to some examples of the present disclosure. At operation 1010, alerts are initialized and initial alert parameters are determined. This operation may include signing up for the service, filling out a profile with information such as which content the user is interested in, what types of alerts they are interested in, how often they wish to receive alerts, and the like. For example, the user may specify the types of trigger events (e.g., topics) that trigger a system communication. Example events include a stock price change that exceeds a threshold, a market sector or index gains or losses exceeding a threshold, and the like. Users may also specify other topics of interest. Furthermore, the user may specify one or more actions that the automated portfolio management system should take to mitigate certain risk in the event one or more market conditions are met. The process also includes asking permission for and getting authorization to access one or more online behaviors of a user (e.g., getting access to a social networking account of a user). FIG. 2 provides additional details of operation 1010.

Once operation 1010 is completed, operations 1020 and 1030 are performed periodically or in response to a trigger condition. Operations 1020-1030 may be performed periodically with a predetermined periodicity (e.g., a social networking account is checked, or market metrics of interest are checked), or may be performed based upon a received indicator. For example, the automated portfolio management system may register with a network-based market indicator source to receive market indicators and the like and operations 1020-1030 may be performed when a market indicator is received from the network-based market indicator source (e.g., a market price source). In other examples, the system may register with one or more social networking accounts of the user to receive new posts to their social media account and operations 1020-1030 are executed in response to receiving a new post.

In yet other examples, applications installed on the user's computing devices (e.g., a mobile device, desktop, laptop, tablet, wearable, or the like) may report information about the users (e.g., search history) and operations 1020-1030 may be executed in response to receiving information on the user. In still other examples, the system may receive feedback from a user in response to one or more alerts and may execute operations 1020-1030 in response. At operation 1020, the system may check for, or receive, indicators that a user's alert parameters are to be adjusted. At operation 1030 the system determines any adjustments to the alert parameters that are to be made as a result of any newly discovered indicators. One or more of: frequency, type, and subject matter indicators may be adjusted as a result of the newly received indicator(s).

Figure 3:
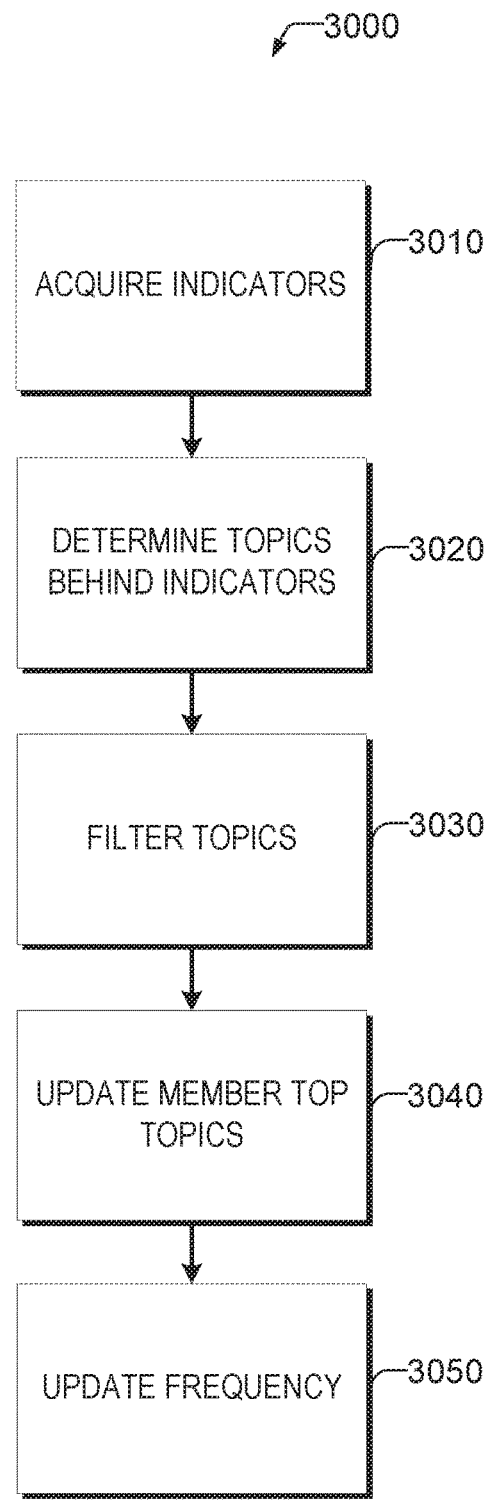
FIG. 3, is a flowchart of a method of updating alert parameters based upon indicators according to some examples of the present disclosure.

Subject matter parameters may be adjusted as the result of indicators that a user is interested in a particular topic. For example, a user's online activity may reveal topics of interest. Content interactions from one or more social networking services of the user, Internet search history of the user, email content of the user, text messages of the user and the like may be analyzed to determine topical interest. For example, a Latent Dirichlet Algorithm (LDA) may be utilized to determine a topic underlying the content the user interacted with, the email, the SMS, the IM, the Internet search history, and the like. Topics generated by the LDA may be clustered into one or more groups of similar topics using clustering algorithms such as K-means. Topic clusters with a high number of communications or interactions may be added to a list of subject matters the user is interested in. Alerts may be chosen to be about topics the user is interested in. FIG. 3 shows one example of adjusting alert parameters responsive to indicators.

Instead of using LDA, or in addition to using LDA, the system may employ keyword matching. The system may scan the online communications of the user for certain predetermined keywords or keyphrases, and may adjust the subject matter of the alerts if one of these keywords or keyphrases is found. For example, the system may have a list of words or phrases to indicate certain life-events of the user, such as the word "baby" (e.g., "congratulations on the baby!"). Detecting of these words or phrases in indicators of the user may cause the system to add subject matter topics related to the life event.

While some implementations may utilize a keyword list, other implementations may also utilize natural language processing (NLP). For example, information extraction algorithms, such as using a naïve Bayes classifier, maximum entropy models, hidden markov models, conditional markov models, conditional random fields or the like. For machine learning models, the models may be constructed using training data that is collected from previously gathered indicators that is manually labelled with the indicator meaning.

Alert frequency parameters may also be adjusted as the result of indicators that more frequent alerts would be helpful to a user. Example indicators include market indicators that indicate high rates of change in one or more market prices or metrics. For example, this may be defined as a rate of change above a predetermined threshold in one or more market prices or metrics that is relevant to holdings in the user's portfolio. Whether a market indicator is relevant to holdings in the user's portfolio may be determined based upon a predetermined mapping of financial holdings to market indicators.

In response to detection of a market indicator that is relevant to the user and that indicates a high rate of change, the system may determine adjustments to alert parameters, for example, increasing an alert frequency. Similarly, the system may decrease an alert frequency if market conditions are not changing rapidly. Market indicators may include the stock price of a holding of the user, prices or other metrics corresponding to the industry of a holding of the user, or general indexes (e.g., the Dow Jones Industrial Average), or the like. The increase or decrease in the alert frequency may be a predetermined increase (or decrease), or may be based upon the rate of change in the market indicator (e.g., the more volatile the situation, the more the alert frequency may change). One example formula for determining the alert frequency may be to calculate the difference between the current rate of change of the market indicator and the standard deviation of the rate of change over a historic predetermined period of time and multiply that by a predetermined scaling factor to produce an increase or decrease in alert frequency.

The amount of increase in the threshold may also be adjusted relative to a level of expertise the user has. For example, the amount of increase may be based upon the rate of change in the market indicator and also adjusted down if the user is a more experienced trader and adjusted up if the user is a less experienced trader. The user's expertise may be initialized at profile setup and may be adjusted dynamically based upon the length of time the user has an account, the number of trades a user makes, and the overall level of interaction of the user.

For example, the user's expertise may be a score calculated based upon a weighted sum of the age of the user's account, the number of trades, the trading volume, the number of interactions with alerts, and the expertise calculated or entered by the user at account setup. The weights to apply may be predetermined by an administrator. The alert frequency change based upon high market indicator change rates may be increased or decreased based upon a formula utilizing the expertise score, or may be increased or decreased based upon predetermined increases or decreases based upon expertise score ranges. For example, an administrator may predetermine a table such as the following:

| Expertise Score | Extra Increase in alert frequency per day (above the already determined frequency change) |
| --- | --- |
| 0-10 (beginner) | +3 |
| 10-20 (novice) | +2 |
| 20-40 (average) | +1 |
| 40-50 (expert) | 0 |
| 50-60 (professional) | −2 |

In some examples, a user may have multiple holdings, each with corresponding market indicators (e.g., stock price, industry indicators, or the like). In some examples, the system calculates an alert frequency independently for each separate indicator. The highest alert frequency calculated may then be used as the alert frequency. For example, if a user has two stock holdings corresponding to two separate market indicators, and one market indicator has a high rate of change and the other does not, then the alert frequency calculated for the market indicator with a high rate of change may be utilized (as it is likely to be higher). As noted, the alert frequency may be adjusted for the user's expertise.

In other examples, to handle multiple market indicators, the alert frequency may be calculated by using a weighted sum. For example, the alert frequencies may be calculated for each different market indicator, each alert frequency may then be multiplied by a weighting factor, summed, and then modified by the aforementioned expertise modifier to produce a new alert frequency. The weights for the weighted summation may be predetermined, or may be learned using one or more machine learning techniques. For example, a set of training data with market indicators and expertise levels may be created (e.g., using past data) and manually labelled with a desired alert frequency. The system may then use techniques such as linear regression or support vector machines to learn the weights.

While market indicators that indicate market change may increase the frequency of alerts, it may also change the subject matter parameters. For example, the cause of high change in a market indicator may be added to the topics in the subject matter parameters. For example, alerts may be indicators that have topics that correspond to the high rate of change in the indicator.

While the expertise level of the user may affect the frequency of alerts, the expertise may also affect the content sent to the user. Another alert parameter may be an expertise level of the alert. For example, a more in-depth article may be sent to users who have a lower expertise, and a shorter and more concise article may be sent to users who have a higher expertise level. Moreover, the subject matter may be more advanced for more advanced users and less advanced for less advanced users. Articles may be rated on the level of skill needed to understand the content of the articles. This may be done based upon a manual tagging process, or may be done using a trained classifier that is trained based upon content, expertise level pairs. The classifier may then output, given a new content article, a level of expertise appropriate for the content. In some examples, only content that is appropriate for the user's level of expertise may be sent.

Alert parameters corresponding to the type of alert may be adjusted based upon explicit or implicit feedback from a user. Explicit feedback is provided by direct input from the user. Implicit feedback is provided indirectly by the user. For example, the system may presume that alerts that the user engages or interacts with are of a content and type that are acceptable to the user. Alert types may include email, text messaging, alerts in an application, voice message, alerts for a wearable electronic device, and even in some examples, alerts to a third party such as a financial advisor that they should call the user and discuss the situation personally.

In some examples, the system may track the user's interactions with the alerts. Interactions includes viewing, forwarding to others, printing, commenting on, copying text from, liking (e.g., by utilizing a "like" or similar button), and the like. Interactions with alerts of certain types, but not others, indicates a user's preference to receive alerts that are of a type they engage with.

The system may track interactions in one or more ways. For example, alerts may have one or more customized addresses (e.g., Universal Resource Locators URLs) that are unique for each user. The URL leads the user to the content. If the user accesses the URL, the system infers that they have engaged with the content. Other interactions may be tracked using an application installed on a user's computing devices that corresponding to the automated portfolio management system. In other examples, the interactions may be tracked using tracking cookies, embedded images (e.g., in emails), and the like.

The system may track the number of interactions for each type of alert. The system may choose the alert type to use for a given alert based upon the number of interactions for each type of alert relative to other types of alerts. Thus, an alert with a high number of interactions relative to other alert types may be utilized when sending an alert. For example, the alerts may be ranked based upon interactions and the top two, three, or other predetermined number of alert types may be utilized to send alerts to the user. In other examples, to diversify the alert types (e.g., to avoid sending alerts using only one or two types which then ensures those alerts are highest in interactions), the alert type sent may be partially randomized, but in such a way to ensure that alert types with the highest number of interactions are selected more often. For example, the interactions may be scored by multiplying a small random number generated for each alert type and multiplied by the interaction percentage of the alert type (e.g., the percentage of total interactions that resulted from the alert type). The interaction with the highest score may be selected.

In other examples, an alert type selected may be based upon a round robin approach, or may be based upon a suitability of the particular alert content to each alert type choice. For example, market price alerts may be suitable for a text message, whereas a news story may be more suitable for email. Suitability may be defined in advance through a table listing possible content types (e.g., news, market quotes, etc), with an ordered list of suitable alert types. In these examples, the system may first determine the suitable alert types for the content and then, among those suitable alert types, choose a particular alert type based upon interaction numbers.

Returning to FIG. 1, operations 1040-1060 may send alerts to users. These operations may be run in parallel with operations 1020-1030. Operations 1040-1060 may be run when an item of content is received or discovered by the system, or may be run at predetermined intervals (e.g., to satisfy an alert frequency parameter).

At operation 1040 the system may determine that an item of content matches one of the topics in the subject matter alert parameters of the user. Content may be selected and uploaded to the system by one or more system administrators, received from one or more market news sources, or scraped from one or more websites. LDA analysis, or other latent topic algorithms, may be utilized to determine one or more topics that correspond to the articles. Additionally, K-means may be utilized to cluster the article topics into clusters. Articles fitting into topic clusters that match topic-of-interest clusters of users may be selected.

In some examples, an expertise level of the item of content may be checked to ensure that the item of content's expertise level matches the expertise level of the user. As noted, this may be done based upon a manual tagging process, or may be done using a trained classifier that is trained based upon content, expertise level pairs. The classifier may then output, given a new content article, a level of expertise appropriate for the content. In some examples, only content that is appropriate for the user's level of expertise may be sent.

At operation 1050 a check is made to determine that sending this alert does not violate the alert frequency parameters. For example, the frequency parameter may specify that only X number of alerts may be sent in Y time frame. Frequency parameters may be system specific, user specific, alert type specific (e.g., a maximum of 5 texts in an hour, a maximum of 3 emails an hour), or the like. As noted previously, the frequency parameters may be dynamically adjusted based upon the indicators. The check may determine whether the system has already sent the maximum number of alerts for the current time period. If sending this alert would violate the alert frequency parameters, the alert may be saved for later or not sent at all. At operation 1060 the item of content is sent to a user, and information for calculating whether the frequency parameters are exceeded is updated. The alert type is calculated as previously described. Sending the alert may include sending a text message, an email, posting a notification to a social networking account of the target user, or providing an alert in a dedicated application executing on a computing device of the user.

Turning now to FIG. 2, an example method 2000 of a user signing up for the service is shown according to some examples of the present disclosure. At operation 2010 the system presents a graphical user interface (GUI) for signing up. The GUI may be in the form of one or more user interface descriptors (e.g., a HyperText Markup Language HTML file, or the like) sent by the service (e.g., by a webserver of the service). In other examples, the GUI may be provided by a local application provided by the service that runs on the user's computing device. In some examples, the application may be a local application, in other examples, the application may be a web-based application. The GUI may lead the user through one or more forms for entering personal information, investment information, risk information, alert preferences, and the like. The GUI may also have one or more questionnaires to assess the investor's level of skill. The GUI may also ask for authentication and authorization to access one or more social networking accounts and other online network activity of the user. Social networking accounts may include FACEBOOK® accounts, GOOGLE PLUS® accounts, TWITTER® accounts, and the like. Other online network activity may be monitored, such as online search and browsing activity. The system may get permission to track this activity, and may provide one or more applications for the user to install on their computing devices to track this activity.

At operation 2020 the system may receive the user's answers to the questions and process them to create a profile for the user. At operation 2030, for each online service provider (e.g., social networking service or other service) the user has authorized the system to track, the system may authenticate and authorize. For example, the system may have the user explicitly authorize the system to access their information through the social networking site (e.g., following an Open Authentication Protocol—OAuth). In these examples, the user may be re-directed to a webpage on the network service that asks the user to authenticate or authorize the system. The system may then provide an authentication token back to the system to allow access. This token may be stored in the user's profile.

Turning now to FIG. 3, a method 3000 of updating alert parameters based upon indicators is shown according to some examples of the present disclosure. At operation 3010 the system may acquire one or more indicators such as online communications or behavior, market indicators, or the like. In some examples, the system may periodically connect with an online social networking service where the user has an account and downloading various communications since the last update. In other examples, the system may receive these communications directly (e.g., register to receive a "push" notification). In still other examples, the system may have an account on the social networking service and the user may "friend" or "connect" with the system account to give the system account access to the user's social networking information. Other example online communications include Internet browsing history, search engine history, or the like. These other communications may be acquired using an application residing on one or more of the computing devices of the user. Market indicators may be scraped from network accessible financial news outlets, or may be sent directly by these outlets, or other sources.

At operation 3020, the system may determine one or more topics behind the indicators. For example, using a Latent Dirichlet Allocation machine learned model. LDA classifies documents (in this case indicators or content that is the subject of an indicator) based upon a probability that the content relates to a particular topic. Topics with probabilities above a predetermined threshold may be considered the one or more latent topics of operation 3020.

Market indicators may go through an LDA analysis in some examples, but in other examples, they have predetermined topics of interest that are associated with those indicators. Thus, at operation 3020, the topic may be determined using a lookup table. For example, a company's stock price has a topic corresponding to that company. A market indicator reflecting the performance of many stocks (e.g., Dow Jones Industrial Average) may have a general market news topic for news related to that market. In some examples, topics corresponding to market indicators are added to the topics of interest automatically. In other examples, if the rate of change of the market indicators is above a predetermined threshold, then the market indicator may be added to the topics in addition to the predetermined percentage or amount of topics generated from the online communications of the users. Similarly, content may be scanned for keywords or keyphrases that indicate a life event. Any topics determined from this keyword or keyphrase search may be added to the list of topics at operation 3020.

At operation 3030 the topics may be filtered. For example, irrelevant topics about the user that do not relate to financial alerts may be removed. This may be done using either a whitelist (a list of latent topics that are known to be financial in nature) or a blacklist (a list of latent topics that are known not to be financial in nature).

At operation 3040 the content topic parameters may be updated based upon one or more of the filtered topics or other indicators (e.g., market indicators). For example, the system may track topics of interest to the user. The number of indicators corresponding to the topic and how long ago the indicator was posted may be factors in determining top topics. In some examples, the highest predetermined number or percentage of topics, as determined by topic score, may be utilized as the topic parameter for alerts.

One example topic scoring function may be to sum all the indicators within a predetermined time frame that produced a particular topic. In some examples, each indicator may be time weighted such that more recent indicators are weighted more heavily. For example:

$$\Sigma_1^n(\text{max time} - \text{time since indicator}) * \text{indicator value}$$

where n is the number of indications corresponding to that topic, max time is a predetermined maximum age of an indicator for it to be considered (e.g., 14 days), time since indicator is the age of the indicator (e.g., it was posted 2 days ago) and the indicator value may be a predetermined constant (e.g., 1). In one example, if a certain topic had two indicators, one that was 2 days ago and another one that was 10 days ago, the maximum time is 14 days and the indicator value is 1, the topic score for that topic would be: $(14-2)*1+(14-10)*1=16$.

At operation 3050, in addition, or instead of operation 3040, the indicators may also be utilized to update the frequency of alerts. This is in addition to, or instead of the previously disclosed method of updating the frequency as a result of market indicators. For example, if a topic score is above a predetermined amount as a result of a large amount of indicators, the frequency may be increased by a predetermined amount. In some examples, the frequency may be increased proportionally with the indicator frequency. Thus, the more frequent the indicators, the more the alert frequency parameter is increased.

Figure 4:
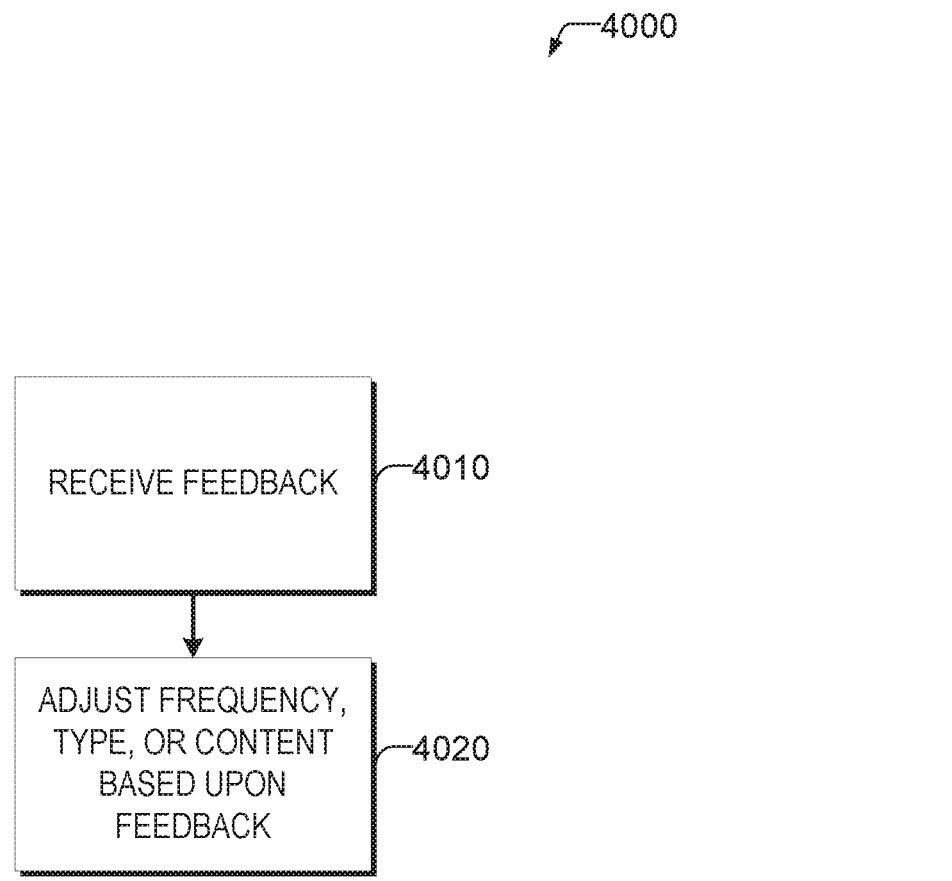
FIG. 4 is a flowchart of a method of adjusting alert parameters based upon feedback from the user according to some examples of the present disclosure.

FIG. 4 shows an example method 4000 of adjusting alert parameters based upon feedback from the user. At operation 4010 the system receives feedback on the alerts from the user. Feedback may include information on content interactions or closed-loop direct feedback. For example, if the user clicked on a link in the alert, opened the alert, had the alert open for greater than a predetermined amount of time (an indication that they may have read the alert), liked the alert, commented on the alert, shared the alert, or otherwise consumed the alert. Closed-loop direct feedback may be the result of the user clicking on or otherwise activating a user interface element (e.g., a button or link) in the alert that indicates the user's satisfaction or dissatisfaction with the alert, including the topic, frequency, and type of alert. This feedback may be gathered through the use of one or more monitoring techniques that may be different based upon the type of alert. Example techniques include gathering feedback from one or more social networking services that the user is a member of—either through the API of the social networking service or through the "friend" or "connection" with the user by an account of the system. Other techniques include tracking cookies, tracking images (e.g., images in an email called web beacons), sending links as the alert and determining if they have checked the link, or the like.

At operation 4020 the type of alerts may be adjusted as previously discussed to favor alerts that are interacted with often. Other feedback may include explicit feedback about the content or frequency. For example, a link or button on the alerts may allow users to tell the system their preferences about the type of alert, alert frequency, and alert content. At operation 4020, this feedback may remove one or more topics from the topic preferences (and put this topic on a black list to prevent it from being added again in the future), or reduce the frequency (and limit it in the future to prevent it from being increased too soon) or change the alert types.

Figure 5:
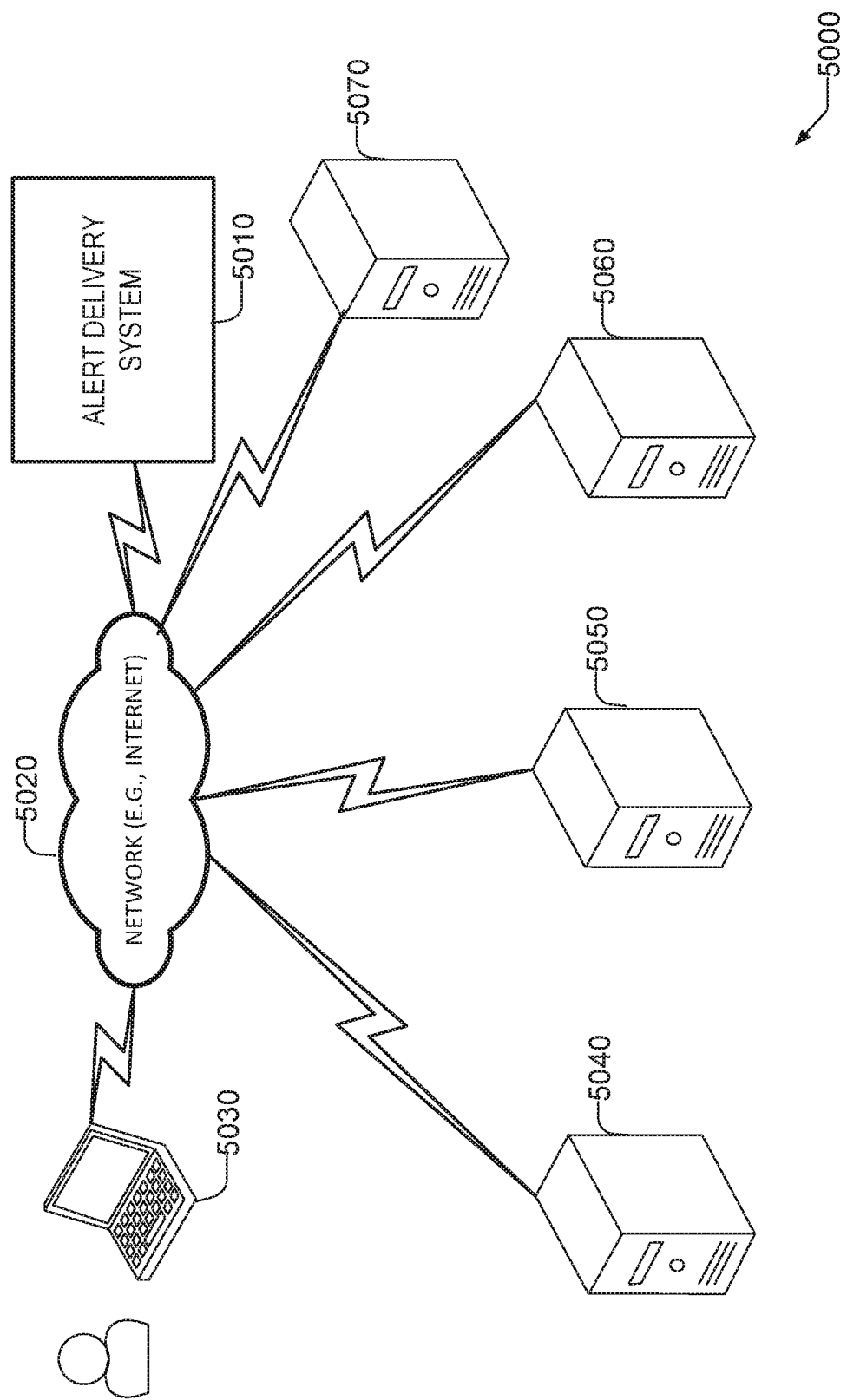
FIG. 5 is an example diagram of an alert delivery system and usage environment according to some examples of the present disclosure.

FIG. 5 shows an example diagram 5000 of an alert delivery system and usage environment according to some examples of the present disclosure. Alert delivery system 5010 may deliver one or more alerts to one or more computing devices of users, such as computing device 5030 over a network 5020, such as the Internet. Alert delivery system 5010 may provide one or more user interfaces (e.g., a Graphical User Interface—GUI) to allow a user to register for alerts and to enter initial preferences. In some examples, the alert delivery system 5010 may be part of or associated with an automated portfolio management system and the setup GUI may be part of an account setup with the automated portfolio management system. GUIs may be communicated to devices (such as computing device 5030) as one or more user interface descriptors. User interface descriptors may include HyperText Markup Language (HTML), JavaScript, Java, Content Style Sheets (CSS), eXtensible Markup Language (XML), or other file formats that are renderable by user computing devices 5030 (e.g., by a browser of the computing device 5030).

Alert delivery system 5010 may create an account for a user and store it in internal storage of the alert delivery system 5010. Included in this account are initial alert parameters. Alert delivery system 5010 may adjust one or more of the alert delivery parameters based upon indicators received by the alert delivery system 5010. For example, alert delivery system 5010 may receive alert indicators from one or more social networking services 5040 and 5050. Alert delivery system 5010 may receive other indicators, such as market indicators from a market price system 5060 and the like as already explained. Alert delivery system 5010 may also receive indicators from an application on the user's computing device (e.g., such as computing device 5030). Alert delivery system 5010 may also receive feedback from the user as to the alert parameters—feedback may be explicit feedback (e.g., clicking on a button indicating like or dislike of an alert, its contents, its type, or its frequency), or implicit feedback (interactions with the alert).

Alert delivery system 5010 may utilize content stored internally, or content received or retrieved over the network 5020 from one or more content sources, such as content source 5070. Content may be subscribed to by alert delivery system 5010, such that content sources (such as content source 5070) send content to the alert delivery system. Some of this content may be sent as alerts to users from alert delivery system 5010. Alert delivery system 5010 may also scrape one or more network based content sources for new content.

Content received by alert delivery system 5010 may be categorized into one or more topics through the use of keyword matching or through the use of LDA analysis as previously explained for indicators. Alert content may then be matched to topics based upon these analysis. Topics may also be clustered using clustering algorithms to ensure that similar topics with slightly different names are grouped together. For example, a topic about the "Ford Motor Company" is grouped with "Ford" and "F"—the company's stock symbol. Clustering may be done using one or more machine learning algorithms such as K-means.

Figure 6:
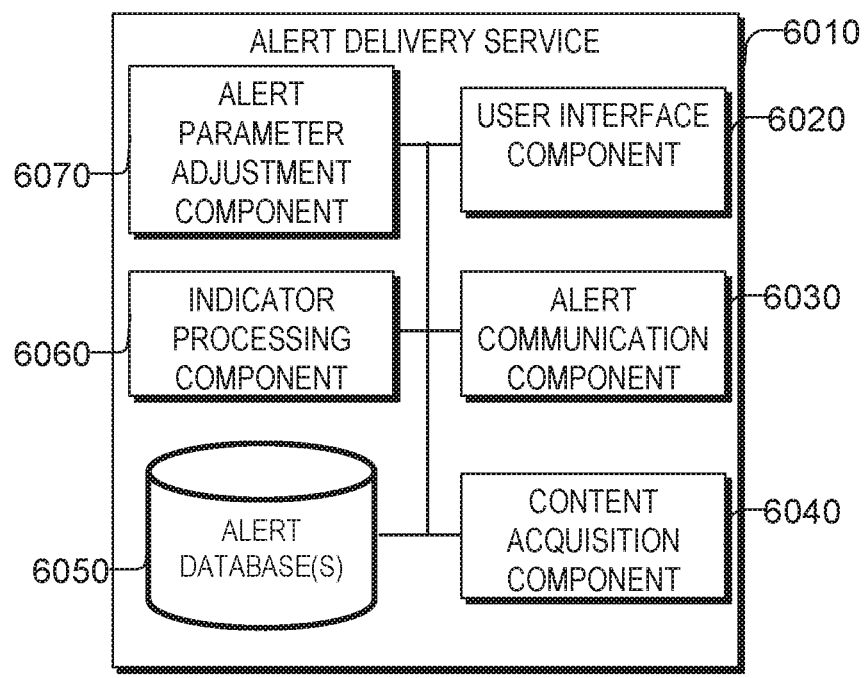
FIG. 6 is a block diagram of an alert delivery service according to some examples of the present disclosure.

Turning now to FIG. 6, a block diagram of an alert delivery service 6010 is shown according to some examples of the present disclosure. User interface component 6020 may provide one or more user interface descriptors upon request from one or more user computer devices. As previously described, these descriptors provide for a setup and account maintenance feature to allow users to setup alert delivery and modify alert delivery. Alert communication component 6030 may utilize one or more alert types to periodically send alerts to registered users as previously described in accordance with one or more alert parameters. Content acquisition component 6040 may receive or find content from external sources. As previously described the content may be sent to the content acquisition component 6040 by content sources as a result of the alert delivery system 6010 registering to receive the content, may be scraped by content acquisition component 6040 or acquired through other means, such as for example the use of an Application Programming Interface (API).

Alert databases 6050 may be one or more databases that store alert content, alert preferences, user information, and the like. Indicator processing component 6060 may receive or request one or more indicators. For example, the indicator processing component 6060 may contact one or more social networking services to retrieve posts and other interests of the user. In other examples, the indicator processing component 6060 requests or retrieves market indicators, or other indicators. Alert parameter adjustment component 6070 utilizes the indicators acquired by the indicator processing component to adjust one or more alert parameters as previously described.

Figure 7:
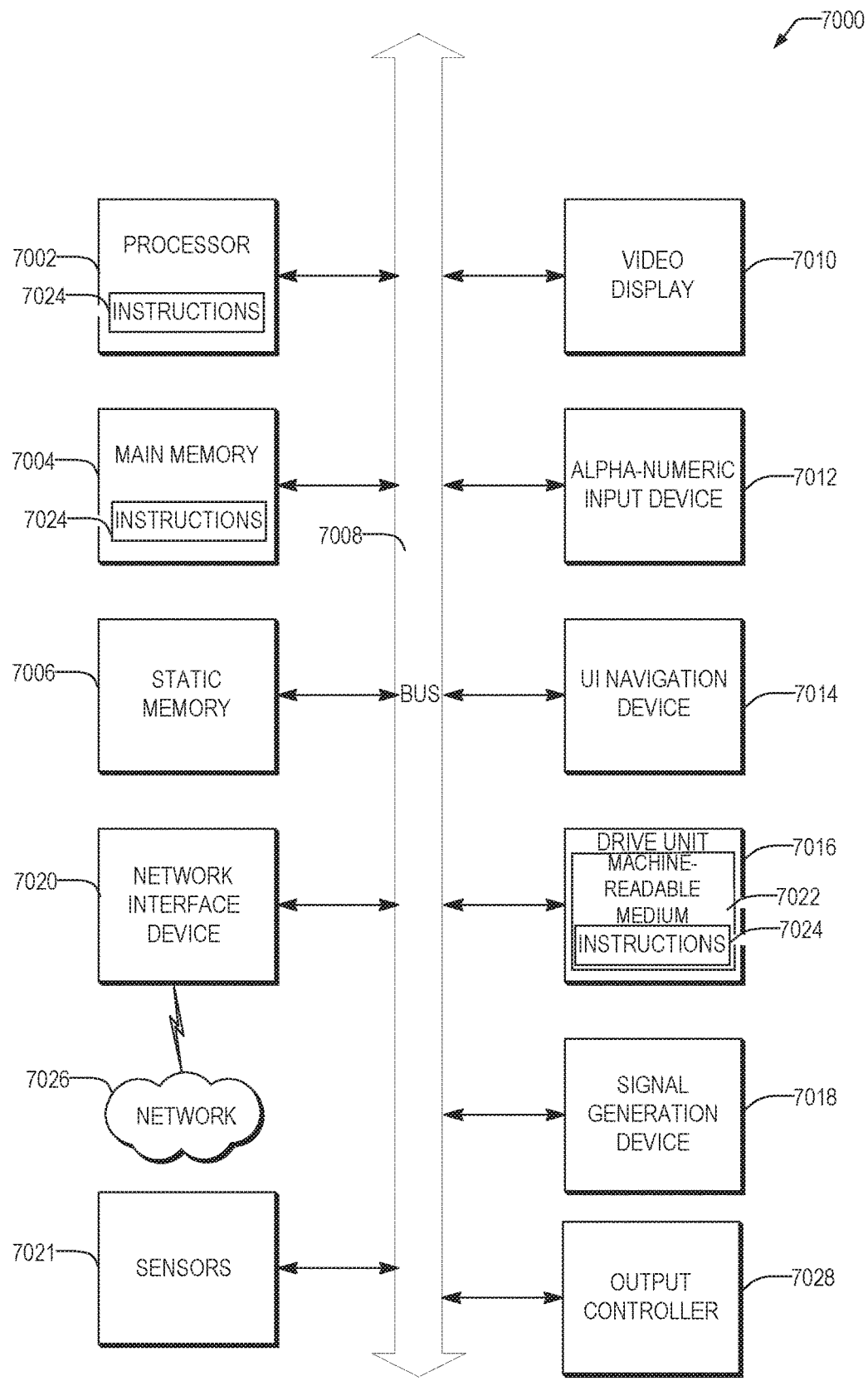
FIG. 7 is a block diagram illustrating an example of a machine upon which one or more embodiments may be implemented.

FIG. 7 illustrates a block diagram of an example machine 7000 upon which any one or more of the techniques (e.g., methodologies) discussed herein may perform. For example, the alert delivery service 6010 may be implemented on one or more machines such as machine 7000. Components of machine 7000 are exemplary and additional or fewer components are possible. In alternative embodiments, the machine 7000 may operate as a standalone device or may be connected (e.g., networked) to other machines. In a networked deployment, the machine 7000 may operate in the capacity of a server machine, a client machine, or both in server-client network environments. In an example, the machine 7000 may act as a peer machine in peer-to-peer (P2P) (or other distributed) network environment. The machine 7000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 7000 may include a hardware processor 7002 (e.g., a central processing unit (CPU), a graphics processing unit (GPU), a hardware processor core, or any combination thereof), a main memory 7004 and a static memory 7006, some or all of which may communicate with each other via an interlink (e.g., bus) 7008. The machine 7000 may further include a display unit 7010, an alphanumeric input device 7012 (e.g., a keyboard), and a user interface (UI) navigation device 7014 (e.g., a mouse). In an example, the display unit 7010, input device 7012 and UI navigation device 7014 may be a touch screen display. The machine 7000 may additionally include a storage device (e.g., drive unit) 7016, a signal generation device 7018 (e.g., a speaker), a network interface device 7020, and one or more sensors 7021, such as a global positioning system (GPS) sensor, compass, accelerometer, or other sensor. The machine 7000 may include an output controller 7028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 7016 may include a machine readable medium 7022 on which is stored one or more sets of data structures or instructions 7024 (e.g., software) embodying or utilized by any one or more of the techniques or functions described herein. The instructions 7024 may also reside, completely or at least partially, within the main memory 7004, within static memory 7006, or within the hardware processor 7002 during execution thereof by the machine 7000. In an example, one or any combination of the hardware processor 7002, the main memory 7004, the static memory 7006, or the storage device 7016 may constitute machine readable media.

While the machine readable medium 7022 is illustrated as a single medium, the term "machine readable medium" may include a single medium or multiple media (e.g., a centralized or distributed database, and/or associated caches and servers) configured to store the one or more instructions 7024.

The term "machine readable medium" may include any medium that is capable of storing, encoding, or carrying instructions for execution by the machine 7000 and that cause the machine 7000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 7024 may further be transmitted or received over a communications network 7026 using a transmission medium via the network interface device 7020. The Machine 7000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 7020 may include one or more physical jacks (e.g., Ethernet, coaxial, or phone jacks) or one or more antennas to connect to the communications network 7026. In an example, the network interface device 7020 may include a plurality of antennas to wirelessly communicate using at least one of single-input multiple-output (SIMO), multiple-input multiple-output (MIMO), or multiple-input single-output (MISO) techniques. In some examples, the network interface device 7020 may wirelessly communicate using Multiple User MIMO techniques.

What is claimed is:

1. A method of delivering customized alerts, the method comprising:

using one or more processors:

determining a set of financial alert parameters based upon preferences of a target user, the set of financial alert parameters comprising a subject matter parameter, frequency parameter, and an alert type parameter, the subject matter parameter indicating a subject matter that relates to a financial interest of the target user;

determining indicator data based upon content posted by the target user to a social networking account of the target user, wherein determining the indicator data comprises:

connecting to a social networking service over a network;

receiving a content item posted by the target user;

determining a latent tonic behind the content item Posted by the target user utilizing a Latent Dirichlet Allocation (LDA) model; and determining that the latent topic is also a latent topic behind a predetermined number of other content items posted by the target user;

adding the latent topic to the subject matter parameter of the set of financial alert parameters;

adjusting the frequency parameter based upon the indicator data, a calculated investment expertise score of the target user, and market indicator data describing volatility of a market;

determining that an item of content matches the subject matter parameter of the set of financial alert parameters;

determining whether sending the item of content would result in a frequency of sending alerts that is below the adjusted frequency parameter of the set of financial alert parameters; and responsive to determining that the item of content matches the subject matter parameter of the set of financial alert parameters and determining that sending the item of content would result in the frequency of sending alerts that is below the frequency parameter of the set of financial alert parameters, sending the item of content as an alert to the target user based upon the alert type parameter of the set of financial alert parameters, wherein sending the item of content comprises one of: sending a text message with the item of content, sending an email with the item of content, posting a notification to a social networking account of the target user, or providing an application notification on a mobile device of the target user.

2. The method of claim 1, wherein the latent topic is a life event.

3. The method of claim 1, wherein the latent topic is related to a financial market event.

4. The method of claim 1, wherein adjusting the frequency parameter based upon the indicator data comprises:

determining that a frequency of content items posted by the target user with a particular latent topic related to finance has increased during a predetermined time period, and in response, increasing the frequency parameter of the set of financial alert parameters.

5. The method of claim 1, comprising:
determining an adjustment to the alert type parameter based upon one of:
content interactions with alerts sent or explicit feedback.

6. A system for delivering customized alerts, the system comprising:
a processor;
a memory, coupled to the processor, and containing instructions, which when performed by the processor, causes the processor to perform operations to:
determine a set of financial alert parameters based upon preferences of a target user, the set of financial alert parameters comprising a subject matter parameter, frequency parameter, and an alert type parameter, the subject matter parameter indicating a subject matter that relates to a financial interest of the target user;
determine indicator data based upon content posted by the target user to a social networking account of the target user;
adjust the frequency parameter based upon the indicator data, a calculated investment expertise score of the target user, and market indicator data describing volatility of a market;
determine that an item of content matches the subject matter parameter of the set of financial alert parameters, wherein determining the indicator data comprises:
connecting to a social networking service over a network;
receiving a content item posted by the target user;
determining a latent topic behind the content item posted by the target user utilizing a Latent Dirichlet Allocation (LDA) model; and
determining that the latent topic is also a latent topic behind a predetermined number of other content items posted by the target user;
adding the latent topic to the subject matter parameter of the set of financial alert parameters;
determine whether sending the item of content would result in a frequency of sending alerts that is below the adjusted frequency parameter of the set of financial alert parameters; and
responsive to a determination that the item of content matches the subject matter parameter of the set of financial alert parameters and a determination that sending the item of content would result in the frequency of sending alerts that is below the frequency parameter of the set of financial alert parameters, send the item of content as an alert to the target user based upon the alert type parameter of the set of financial alert parameters, wherein sending the item of content comprises one of: sending a text message with the item of content, sending an email with the item of content, posting a notification to a social networking account of the target user, or providing an application notification on a mobile device of the target user.

7. The system of claim 6, wherein the latent topic is a life event.

8. The system of claim 6, wherein the latent topic is related to a financial market event.

9. The system of claim 6, wherein the operations to adjust the frequency parameter comprise operations to:
determine that a frequency of content items posted by the target user with a particular latent topic related to finance has increased during a predetermined time period, and in response, increase the frequency parameter of the set of financial alert parameters.

10. The system of claim 6, wherein the operations are to:
determine an adjustment to the alert type parameter based upon one of:
content interactions with alerts sent or explicit feedback.

11. A non-transitory machine-readable medium, comprising instructions, which when performed by a machine, causes the machine to perform operations comprising:
determining a set of financial alert parameters based upon preferences of a target user, the set of financial alert parameters comprising a subject matter parameter, frequency parameter, and an alert type parameter, the subject matter parameter indicating a subject matter that relates to a financial interest of the target user;
determining indicator data based upon content posted by the target user to a social networking account of the target user, wherein determining the indicator data comprises:
connecting to a social networking service over a network;
receiving a content item posted by the target user;
determining a latent topic behind the content item posted by the target user utilizing a Latent Dirichlet Allocation (LDA) model; and
determining that the latent topic is also a latent topic behind a predetermined number of other content items posted by the target user;
adding the latent topic to the subject matter parameter of the set of financial alert parameters;
adjusting the frequency parameter based upon the indicator data, a calculated investment expertise score of the target user, and market indicator data describing volatility of a market;
determining that an item of content matches the subject matter parameter of the set of financial alert parameters;
determining whether sending the item of content would result in a frequency of sending alerts that is below the adjusted frequency parameter of the set of financial alert parameters; and
responsive to determining that the item of content matches the subject matter parameter of the set of financial alert parameters and determining that sending the item of content would result in the frequency of sending alerts that is below the frequency parameter of the set of financial alert parameters, sending the item of content as an alert to the target user based upon the alert type parameter of the set of financial alert parameters, wherein sending the item of content comprises one of: sending a text message with the item of content, sending an email with the item of content, posting a notification to a social networking account of the target user, or providing an application notification on a mobile device of the target user.

12. The non-transitory machine-readable medium of claim 11, wherein the latent topic is a life event.

* * * * *

UNITED STATES PATENT AND TRADEMARK OFFICE
CERTIFICATE OF CORRECTION

PATENT NO. : 10,783,583 B1
APPLICATION NO. : 15/146406
DATED : September 22, 2020
INVENTOR(S) : Gunn, Jr. et al.

Page 1 of 1

It is certified that error appears in the above-identified patent and that said Letters Patent is hereby corrected as shown below:

In the Claims

Column 14, Line 27, Claim 1, delete "tonic" and insert --topic-- therefor

Column 14, Line 28, Claim 1, delete "Posted" and insert --posted-- therefor

Signed and Sealed this
Second Day of March, 2021

Drew Hirshfeld
*Performing the Functions and Duties of the
Under Secretary of Commerce for Intellectual Property and
Director of the United States Patent and Trademark Office*